(12) United States Patent
Wells

(10) Patent No.: US 10,994,425 B1
(45) Date of Patent: May 4, 2021

(54) COLLABORATIVE ROBOT HAND BEARING FOR HIGH-TORQUE TIGHTENING APPLICATIONS

(71) Applicant: TOYOTA MOTOR ENGINEERING & MANUFACTURING NORTH AMERICA, INC., Plano, TX (US)

(72) Inventor: Keith J. Wells, Evansville, IN (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/694,328

(22) Filed: Nov. 25, 2019

(51) Int. Cl.
| | |
|---|---|
| *B25J 19/00* | (2006.01) |
| *B25J 1/02* | (2006.01) |
| *B25J 9/10* | (2006.01) |
| *B25J 9/00* | (2006.01) |
| *B25J 11/00* | (2006.01) |
| *B25J 1/12* | (2006.01) |
| *B23Q 1/26* | (2006.01) |
| *B23Q 1/54* | (2006.01) |
| *B25J 15/00* | (2006.01) |

(52) U.S. Cl.
CPC .......... *B25J 19/0008* (2013.01); *B23Q 1/265* (2013.01); *B23Q 1/54* (2013.01); *B25J 1/02* (2013.01); *B25J 1/12* (2013.01); *B25J 9/009* (2013.01); *B25J 9/108* (2013.01); *B25J 11/005* (2013.01); *B25J 15/0019* (2013.01)

(58) Field of Classification Search
CPC .............................. B25J 19/0008; B25J 9/009
See application file for complete search history.

(56) References Cited

U.S. PATENT DOCUMENTS

| 4,177,002 A | * | 12/1979 | Motoda ...................... B25J 9/00 414/696 |
| 4,260,319 A | * | 4/1981 | Motoda ..................... B25J 9/009 414/589 |

(Continued)

FOREIGN PATENT DOCUMENTS

| CN | 20718104 U | 4/2018 |
| DE | 102006056179 A1 | 6/2008 |

(Continued)

OTHER PUBLICATIONS

EG EM Ltd., ERGO-ARM catalog, Nov. 3, 2017, p. 109, http://www.eg-em.com.tr/images/kategori_pdf/106.pdf.

(Continued)

*Primary Examiner* — Gerald McClain
(74) *Attorney, Agent, or Firm* — Haynes and Boone, LLP

(57) ABSTRACT

An apparatus for coupling a robot arm to a tool that is suspended by an ergonomic arm capable of supporting 3D motion of the tool within a working volume. The apparatus includes a tool sleeve configured to accept the tool, a freely rotating rotary fitting coupled to the tool sleeve, and a coupling that couples a distal end of the robot arm to the rotary fitting. When the tool is inserted into the tool sleeve, the tool is free to rotate around the rotational axis with respect to the robot arm, such that a motion of the distal end of the robot arm does not impose a torque between the robot arm and the tool around the rotational axis, and such that motion of the distal end of the robot arm repositions or reorients the tool within at least a portion of the working volume.

20 Claims, 7 Drawing Sheets

(56) References Cited

U.S. PATENT DOCUMENTS

| | | | | |
|---|---|---|---|---|
| 4,534,694 | A | * 8/1985 | Tuda | ............ B25J 9/046 |
| | | | | 414/735 |
| 6,973,856 | B2 | * 12/2005 | Shibata | ............ B23P 19/06 |
| | | | | 81/57.4 |
| 2011/0320038 | A1 | * 12/2011 | Motoki | ............ B25J 19/0008 |
| | | | | 700/245 |
| 2018/0021900 | A1 | 1/2018 | Huang et al. | |

FOREIGN PATENT DOCUMENTS

| | | | | | |
|---|---|---|---|---|---|
| JP | 59064239 | A | * | 4/1984 | ............ B25J 9/009 |
| JP | 02284884 | A | * | 11/1990 | ............ B25J 9/0087 |
| JP | 2009262304 | A | * | 11/2009 | ............ B25J 9/009 |

OTHER PUBLICATIONS

AIMCO-GLOBAL, AIMCO Tool Support Systems 2017/18, Nov. 3, 2017, p. 6, http://www.aimco-global.com/Data/Sites/1/SharedFiles/UpIDocs/Catalog/LIT-AT120%20Tool%20Support%20Systems_rev%2011-03-17_low_res.pdf.

Flex Machine Tools, "Ergonomic Problem Solving—B-19 with 10 lb. Atlas Copco Grinder", Jan. 27, 2020, YouTube Video, https://www.youtube.com/watch?v=un4FLjAHGCU.

* cited by examiner

COLLABORATIVE ROBOT HAND BEARING FOR HIGH-TORQUE TIGHTENING APPLICATIONS

TECHNICAL FIELD

The subject matter described herein relates to devices and methods for robotic manufacturing. The disclosed soft touch bearing has particular but not exclusive utility for assembly of automotive components.

BACKGROUND

Industrial robots are large, heavy, and capable of applying forces and torques that may be unsafe in proximity to human workers. Industrial robots are therefore designed to operate in designated areas isolated (e.g., fenced off) from human contact. Collaborative robots (also known as cobots) are similar to industrial robots, but are designed to work in close proximity with, or in physical contact with, human workers. A cobot may have limited motive power within safe limits for human interaction, and may have "fault" limits such that if the motive power encounters more than a threshold resistance, the cobot faults or shuts down. Collaborative robots don't require external safeties due to their small payload limits. These robots are designed such that the mechanical torque limits of their rotational joints cannot exceed, for example, 50 Newton-meters (NM). This prevents large-scale utilization of collaborative robots in environments such as automotive assembly shops, for tasks such as high-torque tightening of fasteners. Torque tools typically exceed collaborative robots' capacities.

High-torque tightening (e.g., tightening involving torques of 50 NM-300 NM) may be performed by an industrial robot, but this requires an expensive piece of robotic hardware surrounded by a large, fenced-off safety area. Tightening may also be accomplished by a human team member, with an unpowered, user-movable ergonomic arm being used to support the weight of the torque tool. The ergonomic arm (also known as an ergo arm or zero-balance arm) uses springs to offset the weight it carries, and can thus be moved to different positions with the input of relatively small forces. However, when the torque tool is attached to an ergo arm, during a fastener tightening operation there is still some percentage of torque that is reacted into the team member's hands. In principle, a cobot may also operate a torque tool whose weight is supported by an ergo arm. However, if the transferred torque exceeds a threshold value for which the joints of the cobot are rated, the cobot will fault (e.g., cease powered movement), or even suffer damage. Collaborative robots also have significant limitations on how they can move, such as a maximum of six rotational joints, axes, or degrees of freedom. If they are combined directly with an ergo arm (e.g., by holding and manipulating a torque tool that is also held or suspended from the ergo arm), their range of motion is severely limited, such that they can only traverse a fairly small 3D volume of possible tightening locations or orientations. Furthermore, if the ergo arm is driven against its hard stops or against a rigid object, a "singularity" or lockup condition can occur wherein all possible joint movements of the cobot result in a fault, and the cobot is unable to move until manually repositioned by a human operator. A need therefore exists for improved cobots that are capable of performing manufacturing operations such as high-torque tightening, and that otherwise address the forgoing and other concerns.

The information included in this specification, including the Background and any references cited herein and any description or discussion thereof, is included for technical reference purposes only and is not to be regarded as subject matter by which the scope of the disclosure is to be bound.

SUMMARY

Disclosed is a soft touch bearing that can serve as a "hand" for a collaborative robot in manufacturing applications such as high-torque tightening. Embodiments of the disclosure describe methods and devices for connecting a robot to a torque tool in a manner that provides the robot with an additional axis of movement during operation. In addition, the disclosed embodiments reduce the torque reacted into the robot when the robot is used to operate or maneuver the torque tool.

The soft touch bearing disclosed herein has particular, but not exclusive, utility for automotive manufacturing. One general aspect of the soft touch bearing includes One general aspect includes an apparatus for coupling a robot arm to a tool, including: a tool sleeve configured to accept the tool, where the tool is suspended by an ergonomic arm capable of supporting 3d motion of the tool within a working volume; a rotary fitting coupled to the tool sleeve, the rotary fitting freely rotating around a rotational axis; and a coupling that couples a distal end of the robot arm to the rotary fitting, where when the tool is inserted into the tool sleeve, the tool is free to rotate around the rotational axis with respect to the robot arm, such that a motion of the distal end of the robot arm does not impose a torque between the robot arm and the tool around the rotational axis, and such that the motion of the distal end of the robot arm repositions or reorients the tool within at least a portion of the working volume.

Implementations may include one or more of the following features. The apparatus where the repositioning includes translating the tool in a horizontal or vertical direction, and where the reorienting includes rotating the tool around a desired axis that is different from the rotational axis of the rotary fitting. The apparatus where the rotary fitting is at least one of a ball bearing slip fitting or a roller follower fitting. The apparatus where the tool is rotationally fixed to the ergonomic arm. The apparatus where the ergonomic arm is an unpowered zero-balance arm configured to support a weight of the tool both at rest and during 3d motion of the tool within at least a portion of the working volume. The apparatus where the tool is a torque tool, and where the rotary fitting reduces torque transfer between the torque tool and the robot arm during operation of the torque tool. The apparatus where the coupling is a quick-release coupling. The apparatus where the robot arm is associated with a collaborative robot. The apparatus where the tool and ergonomic arm are configured such that the tool can be operated by either or both of the collaborative robot and a human worker. The apparatus further including the tool. The apparatus further including the robot arm. The apparatus further including the ergonomic arm.

One general aspect includes a method for coupling a robot arm to a suspended tool, including: providing a tool sleeve configured to accept an inserted tool, where the tool is suspended by an ergonomic arm capable of supporting 3d motion of the tool within a working volume; coupling to the tool sleeve a rotary fitting that freely rotates around a rotational axis; and coupling a distal end of the robot arm to the rotary fitting, such that when the tool is inserted into the tool sleeve, the tool is free to rotate around the rotational axis with respect to the robot arm, such that motions of the distal end of the robot arm do not impose a torque between the robot arm and the tool around the rotational axis, and such that the motions of the distal end of the robot arm will reposition or reorient the tool within at least a portion of the working volume.

Implementations may include one or more of the following features. The method where the repositioning includes translating the tool in a horizontal or vertical direction, and where the reorienting includes rotating the tool around a desired axis that is different from the rotational axis of the rotary fitting. The method where the rotary fitting is at least one of a ball bearing slip fitting or a roller follower fitting. The method where the tool is rotationally fixed to the ergonomic arm. The method where the ergonomic arm is an unpowered zero-balance arm configured to support a weight of the tool both at rest and during 3d motion of the tool within at least a portion of the working volume, and the robot arm is associated with a collaborative robot. The method where the tool is a torque tool, and where the rotary fitting reduces torque transfer between the torque tool and the robot arm during operation of the torque tool. The method where the distal end of the robot arm is coupled to the freely rotating fitting via a quick-release coupling.

One general aspect includes a system for automating a manufacturing operation, including: a tool; an unpowered zero-balance ergonomic arm supporting the tool and capable of 3d motion of the tool within a working volume; a collaborative robot including a robot arm; a tool sleeve configured to receive the tool; a rotary fitting that freely rotates around a rotational axis and is coupled to the tool sleeve; and a quick-release coupling that couples a distal end of the robot arm to the rotary fitting, such that when the tool is inserted into the tool sleeve, the tool is free to rotate around the rotational axis with respect to the robot arm, such that motions of the distal end of the robot arm do not impose a torque between the robot arm and the tool around the rotational axis, and such that the motions of the distal end of the robot arm will reposition or reorient the tool within at least a portion of the working volume.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the soft touch bearing, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
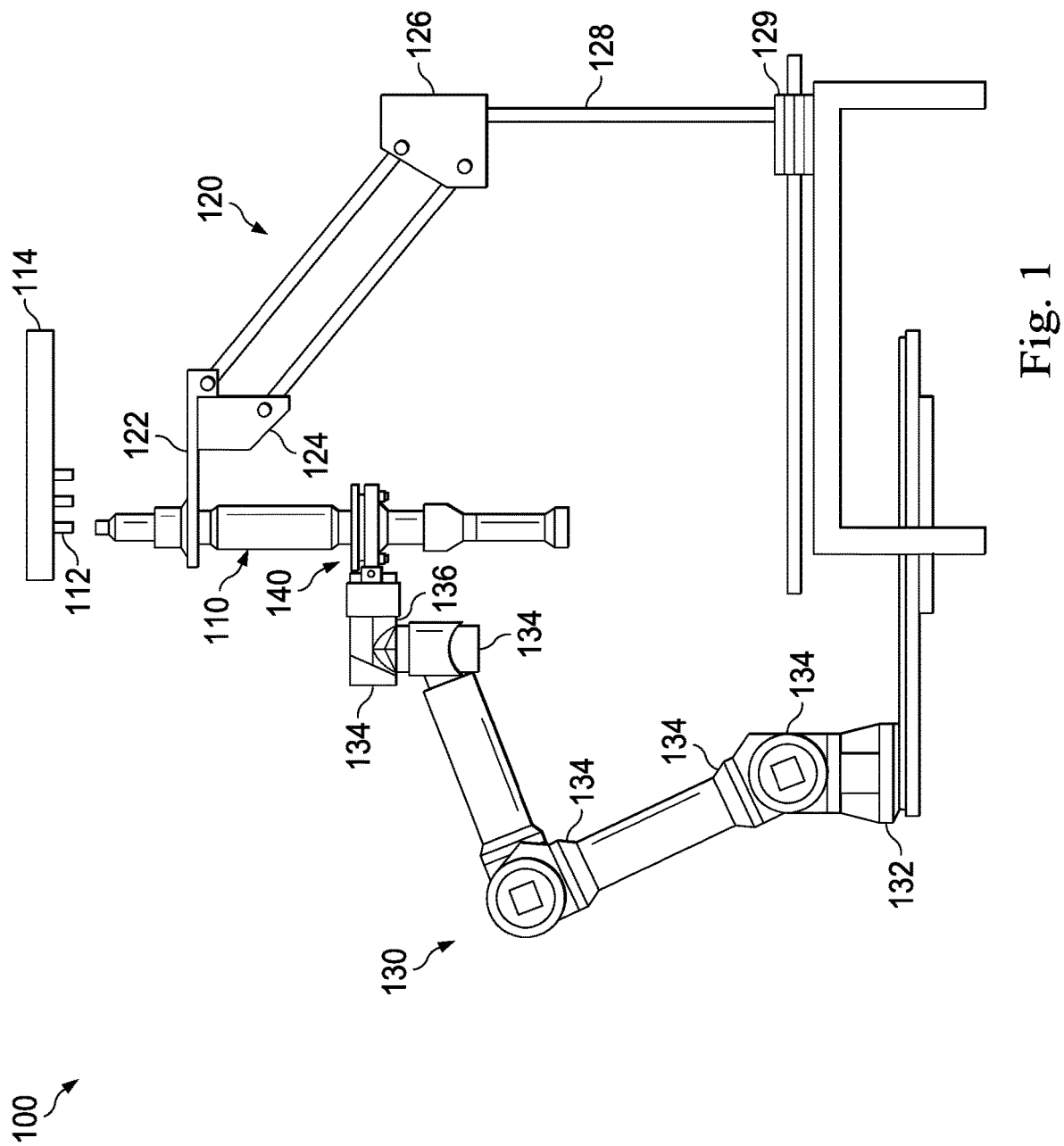
FIG. 1 is a diagrammatic representation of an example assembly line station for high-torque tightening, in accordance with at least one embodiment of the present disclosure.

Embodiments of the present disclosure describe methods and apparatus for connecting a robot to a torque tool that is supported by an ergonomic arm or zero-balance arm. The apparatus is hereinafter referred to as a soft touch bearing. When mounted to the end of an arm of a cobot, the soft touch bearing advantageously provides the robot with an additional axis of movement during operation, such that the range of motion of the robot in conjunction with the torque tool and zero-balance arm is increased. In addition, the disclosed embodiments advantageously reduce the torque reacted into the robot when the robot is used to operate or maneuver a torque tool connected to the zero-balance arm.

The robot may be, for example, a cobot having low (e.g., human-safe) torque limits, limited payload capacity, and limited movement capabilities (e.g., 6 axes of rotation). Alone, the limited capabilities of the cobot may prevent its use in operating torque tools in an automotive assembly shop. For example, certain cobots have a payload capacity of about 5 kg, but some torque tools weigh greater than 6 kg. Typically, an unpowered ergonomic arm or zero-balance arm is used to hold and support the weight of a torque tool, such that a human operator may then move the torque tool around and use the torque tool to tighten various fasteners (e.g., nuts and bolts) that hold automotive parts together. Because the torque tool is typically rotationally fixed to the ergonomic arm, a significant portion of the torque reaction is transferred from the torque tool to the ergonomic arm and not the human operator. However, some torque is still transferred to the human operator. In addition, because the torque tool is rotationally fixed in the tool holder of the zero-balance arm, when the human operator repositions the torque tool and thus the zero-balance arm, the human operator's hand must rotate around the torque tool.

In order to automate certain automotive assembly operations (e.g., tightening of fasteners), it would be desirable to connect a cobot to a tool suspended by an ergonomic arm. This would enable the cobot to perform high-torque tightening operations in the same manner as a human operator, thus reducing labor requirements, lowering costs, and improving throughput and productivity of the automotive assembly line. However, when a cobot is used with an ergonomic arm or zero-balance arm, mobility of the cobot is severely restricted because the "hand" of the cobot is unable to rotate around the tool in the same way as a human hand. Furthermore, a portion of the torque generated by the torque tool is reacted into the arm of the cobot. In some cases, the torque reacted into the cobot may exceed the torque limits of the cobot, resulting in a fault condition or damage to the cobot.

The present disclosure therefore provides a free-rotating bearing, hereinafter referred to as a soft touch bearing, that serves as a "hand" for connecting the cobot to the torque tool and thus addresses the limitations of the cobot. In particular, the bearing allows for the cobot to couple to the torque tool which is held by the ergonomic arm, without the usual motion restrictions. The bearing may be a ball bearing style, a roller follower style slip fitting, or a bushing style slip fitting, where the balls or roller followers are replaced by a bushing sleeve or material to allow the rotation to occur. In one example embodiment, the bearing includes a tool sleeve having a channel for receiving a torque tool. The bearing further includes an upper retainer and a lower retainer. In some examples, the bearing also includes a soft touch slide retainer, at least one roller follower, or both. The bearing is connected to the cobot via a coupling that is attached to the bearing, attached to the cobot, or integrated as part of the cobot.

The soft touch bearing provides the cobot with an additional axis of movement and reduces the torque reacted into the cobot by the torque tool. In some embodiments, the ergonomic arm is able to bear most, if not all, of the weight of the torque tool and most of the torque reaction. The additional axis of movement provided to the cobot by the bearing helps provide enough flex between the torque tool and the cobot such that enough of the torque reaction is dissipated prior to reaching the cobot to prevent a fault condition under typical use cases.

Thus, the soft touch bearing extends the capabilities of the cobot to assembly tasks such as high-torque tightening that are normally reserved for industrial robots or human workers. Even a small cobot with a payload capacity that is less than the weight of the torque tool may be used to operate the torque tool, and may tighten fasteners at joints with torque that exceeds the torque limits of the cobot itself. The cobot may also be used interchangeably with a human worker so that, for example, if the cobot is inoperative for any reason, it may be removed from the assembly station and its functions may be safely and effectively taken over by a human or, alternatively, a human worker performing high-torque tightening operations may be safely and effectively replaced with a cobot.

The present disclosure aids substantially in automating high-torque tightening applications (e.g., applications where the required tightening torque exceeds 50 Newton-meters) with safe, low-cost collaborative robots. The present disclosure accomplishes this by improving the mobility and torque resistance of cobots, and thus their ability to operate torque tools whose weight is born by, and whose torque is partially dissipated by, a zero-balance arm. This improved cobot mobility (e.g., adding a seventh, specialized rotational axis to a six-axis robot) transforms a manual assembly step or industrial robot assembly step into one that can be automated using cobots, without the normally routine need to fence off areas for an industrial robot to operate apart from human workers. This unconventional approach improves the functioning of the automotive assembly line by reducing the need for both human workers and fenced-off robotic areas.

These descriptions are provided for exemplary purposes only, and should not be considered to limit the scope of the soft touch bearing. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic representation of an example assembly line station 100 for high-torque tightening, in accordance with at least one embodiment of the present disclosure. The station 100 includes a torque tool 110 for tightening nuts or bolts 112 into a part 114. In the example shown in the figure, the torque tool faces 110 upward, and the part 114 is located above the torque tool 110 (e.g., carried on a conveyor), although a variety of other orientations (e.g., the part positioned below, beside, diagonal from, or at angles to the tightening tool) are possible, and fall within the scope of the present disclosure.

The assembly line station 100 also includes an unpowered, freely repositionable ergonomic arm 120, also known as an ergo arm or zero-balance arm, that supports the weight of the torque tool 110 and, with the application of small forces, permits the torque tool 110 to be moved to different positions and orientations in a 3D work volume accessible by the ergonomic arm 120. In an example, the ergonomic arm 120 includes a tool holder 122, wrist joint 124, elbow joint 126, stand 128, and base 129, although other configurations may be used instead or in addition.

The assembly line station 100 further comprises a collaborative robot, robotic arm, or cobot 130 that includes a quick-change base 132 that provides power and mechanical anchoring to the cobot 130, and permits the cobot 130 to be readily removed or replaced (e.g., if the cobot 130 is inoperative). The cobot 130 further includes a plurality of powered joints 134 that permit a distal end 136 of the cobot 130 to be moved to a wide variety of different positions and orientations within a work volume accessible by the cobot. The cobot further includes a soft touch bearing 140 that serves as the "hand" of the robotic arm or cobot 130, holding the torque tool 110, and permitting the torque tool 110 to rotate freely relative to the cobot 130. Since the torque tool is rotationally fixed with respect to the ergonomic arm 120, this permits free rotation of the cobot 130 with respect to the torque tool 110, which in turn permits the cobot 130 to move about its six degrees of freedom while holding the torque tool 110. Movement of the cobot 130 results in corresponding movements of the ergonomic arm 120, which supports the weight of the torque tool 110.

Before continuing, it should be noted that the examples described above are provided for purposes of illustration, and are not intended to be limiting. Other devices and/or device configurations may be utilized to carry out the operations described herein.

Figure 2:
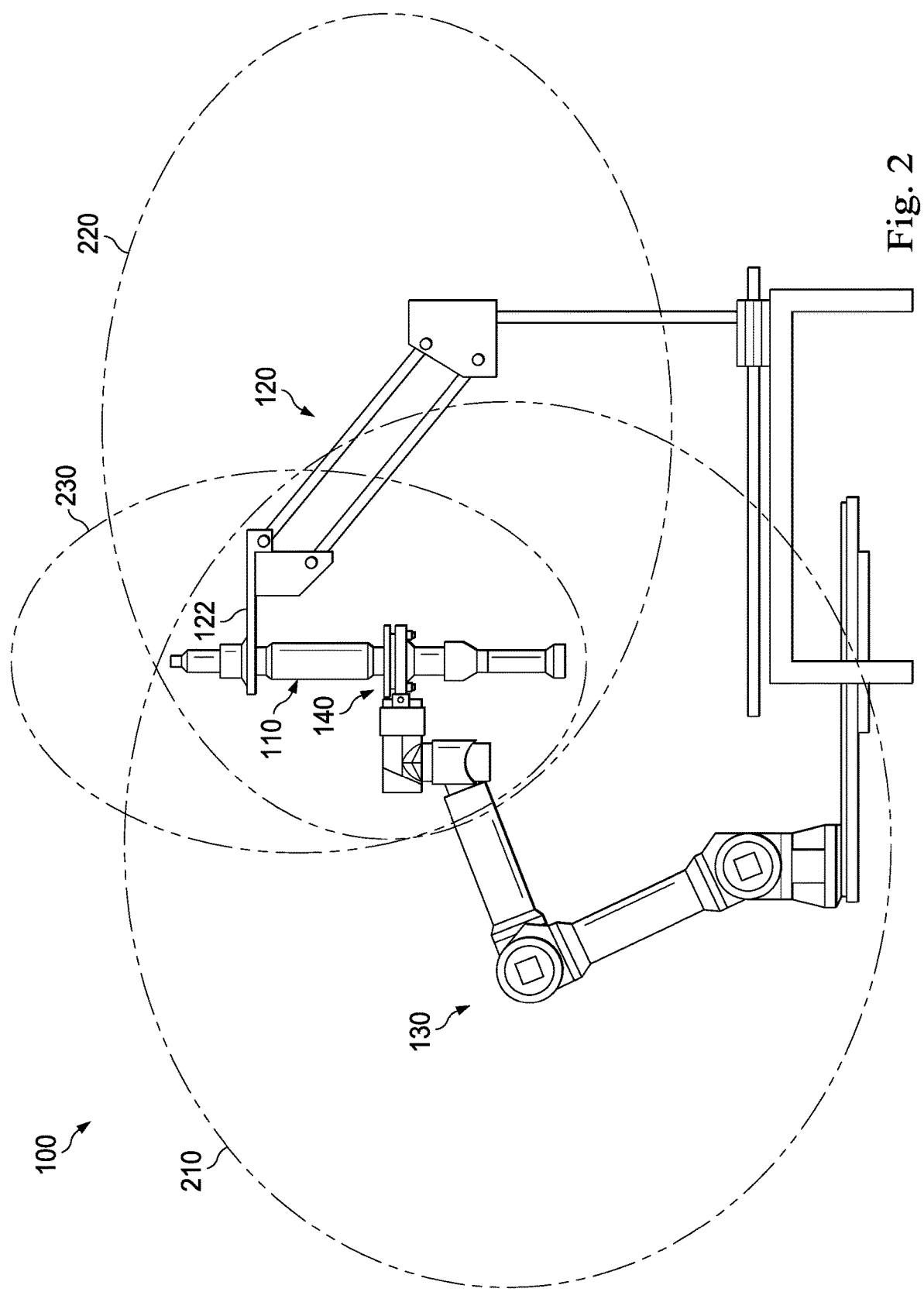
FIG. 2 is a diagrammatic representation of an example assembly line station for high-torque tightening, in accordance with at least one embodiment of the present disclosure.

FIG. 2 is a diagrammatic representation of an example assembly line station 100 for high-torque tightening, in accordance with at least one embodiment of the present disclosure. In an example, the free rotation of the soft touch bearing 140 permits relatively unrestricted movement of the cobot 130 while holding the torque tool 110 that is supported by the ergonomic arm 120. Thus, the overlap between the work volume 210 accessible by the cobot 130 and the work volume 220 accessible by the ergonomic arm 120, offset by the position of the torque tool 110, forms the approximate work volume 230 accessible by the torque tool 110. The torque tool 110 may be held in a vertical position or may, through appropriate rotations of the joints of the cobot 130, be tilted at angles from vertical, e.g., within a cone of up to 30 degrees from vertical, 45 degrees from vertical, 90 degrees from vertical, or otherwise. In such cases, the tool holder 122 of the ergonomic arm 120 must be configured with the ability to tilt by the same amount. Thus, motions of cobot 130 can have the effect of repositioning the soft touch bearing 140 and thus the torque tool 110 by translating it in a vertical and/or horizontal direction, or can have the effect of reorienting the soft touch bearing 140 and thus the torque tool 110 by rotating it by a desired amount around a desired axis that is different from the rotational axis of the soft touch bearing 140.

It is noted that a collaborative robot or other robot may include a processor comprising any combination of general-purpose computing devices, reduced instruction set computing (RISC) devices, application-specific integrated circuits (ASICs), field programmable gate arrays (FPGAs), or other related logic devices, including mechanical and quantum computers. In some embodiments, the processor comprises a memory in which instructions or information are stored, and the processor operates based on the instructions or information. The memory may be co-located on the same board or chip with processing elements or else located external to a board or chip containing processing elements. The memory may comprise any combination of read-only memory (ROM), programmable read-only memory (PROM), electrically erasable read-only memory (EEPROM), magnetic or electronic random access memory (RAM), flash memory, disk or tape drive, or other related memory types. Communication (including but not limited to software updates, firmware updates, or readings from the device) to and from the cobot may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Communication, if any, within the cobot or between components of the cobot may be through numerous methods or protocols. Serial communication protocols may include but are not limited to SPI, I²C, RS-232, RS-485, CAN, Ethernet, ARINC 429, MODBUS, MIL-STD-1553, or any other suitable method or protocol. Parallel protocols including but not limited to ISA, ATA, SCSI, PCI, IEEE-488, IEEE-1284, and other suitable protocols. Where appropriate, serial and parallel communications may be bridged by a UART, USART, or other appropriate subsystem.

Figure 3:
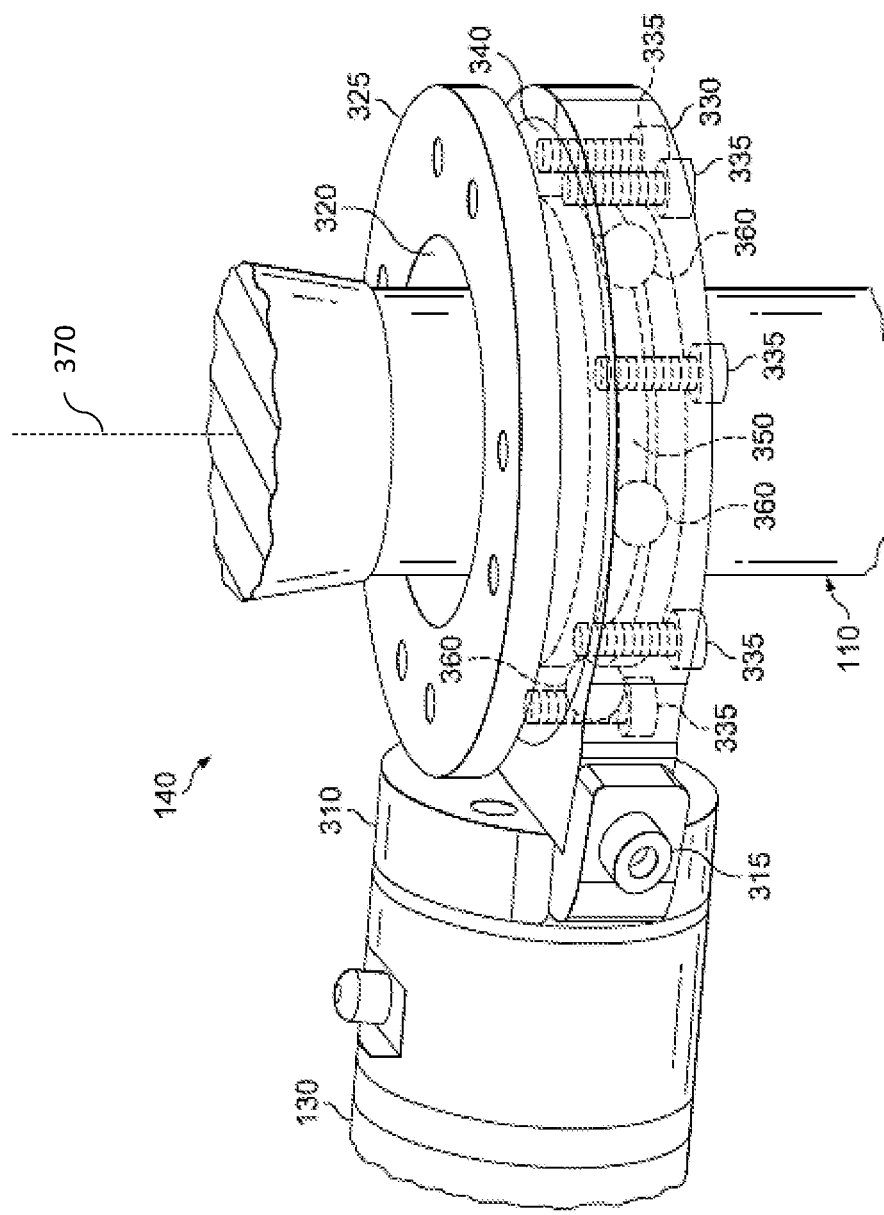
FIG. 3 is a perspective view of an example soft touch bearing, in accordance with at least one embodiment of the present disclosure.

FIG. 3 is a perspective view of an example soft touch bearing 140 in accordance with at least one embodiment of the present disclosure. The soft touch bearing 140 is attached to the cobot arm 130 via a cobot coupling 310 that includes a small number of quick-change fasteners 315 (e.g., two quick-change fasteners) that permit the soft touch bearing 140 to be removed from the cobot arm 130 by removing the quick-change fasteners. Other embodiments may include a quick-change fitting that, for example, permits the soft touch bearing 140 to be removed from the cobot arm 130 with the press of a button, the release of a catch, or other appropriate means.

The soft touch bearing 140 includes a tool sleeve 320 that can in some embodiments use a combination of gravity and friction to hold the torque tool 110. In some embodiments, the tool sleeve 320 is topped by a tool sleeve ring 325. In some embodiments, the tool may be retained in the tool sleeve by means of bolts, set screws, or other means. In still other embodiments, both the tool 110 and the tool sleeve 320 may be fixedly attached to the tool holder of the zero-balance arm (element 122 of FIG. 1), such that the soft touch bearing 140 may freely rotate around both the tool 110 and the tool sleeve 320 around a rotational axis 370.

The soft touch bearing also includes a rotary slip fitting that, in the example shown in the figure, comprises an upper slip retainer 330 attached to a lower slip retainer 340 by means of a plurality of fasteners 335. In other embodiments, the upper slip retainer 330 may be attached to the lower slip retainer 340 with pins, clips, brackets, welds, solder, adhesive, or any other appropriate means. Together, the upper slip retainer 330 and lower slip retainer 340 form a ball bearing race 350 within which a plurality of ball bearings 360 are able to spin, thus enabling the tool sleeve 320, and the torque tool 110 held within it, to rotate freely with respect to the upper slip retainer 330, lower slip retainer 340, and cobot coupling 310.

Figure 4:
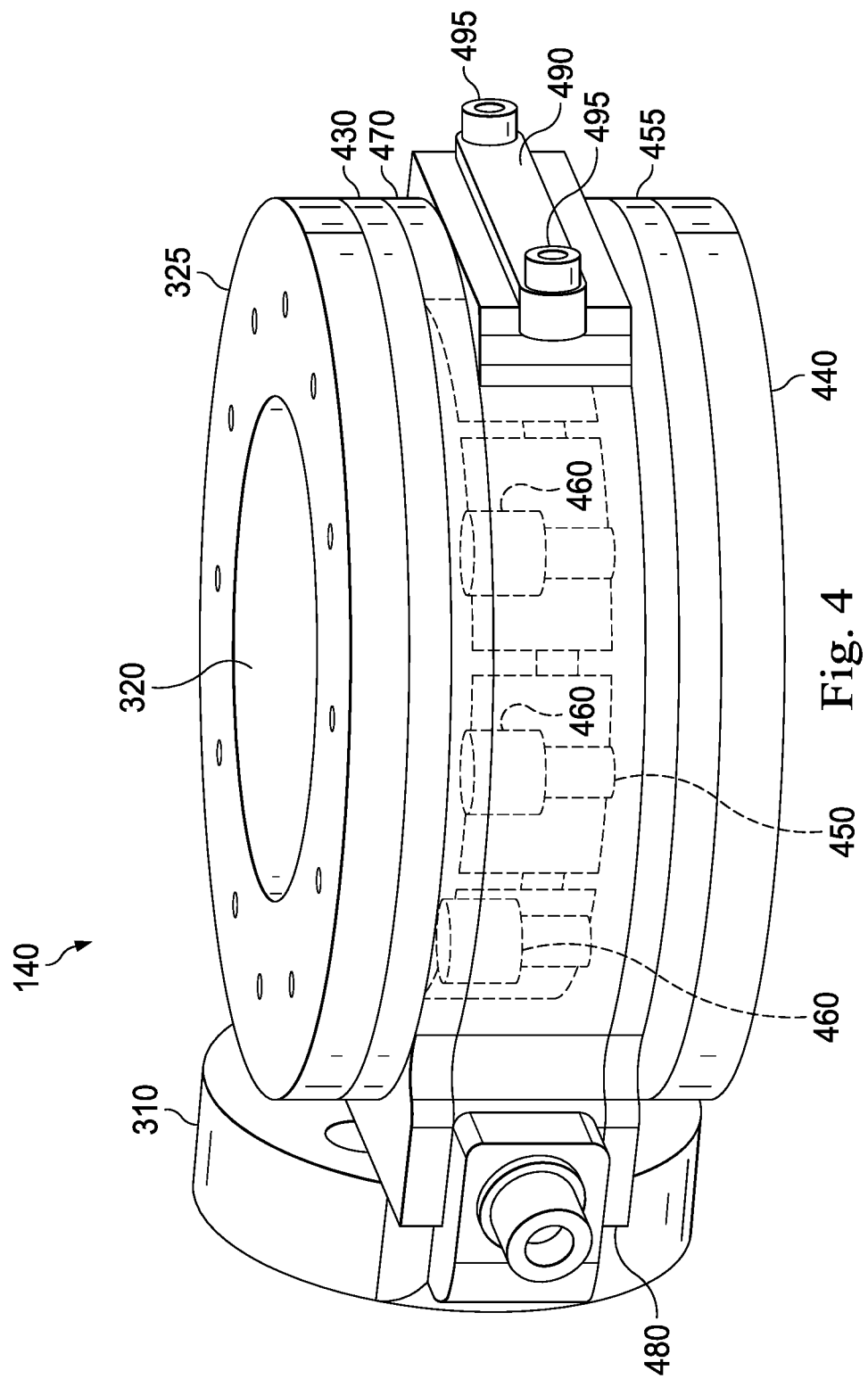
FIG. 4 is a perspective view of an example soft touch bearing, in accordance with at least one embodiment of the present disclosure.

FIG. 4 is a perspective view of an example soft touch bearing 140 in accordance with at least one embodiment of the present disclosure. As with the example in FIG. 3, the soft touch bearing 140 includes a collaborative robot coupling 310, a tool tube or tool sleeve 320, and a tool sleeve ring 325. However, in the embodiment shown in FIG. 4, the ball-bearing-type rotary slip fitting of FIG. 3 has been replaced with a roller follower fitting that comprises an upper slide retainer 430, lower slide retainer 440, upper roller follower 450, lower roller follower 455, a plurality of rollers 460. To provide proper component fit and attachment, the soft touch bearing may optionally include components such as an upper spacer 470, lower spacer 480, slide retainer attachment 490, fasteners 495, and other such retaining and attachment hardware as may be necessary depending on the implementation.

Based on design considerations, other types of rotary fittings or rotary unions may be used in place of a ball bearing slip fitting or roller follower fitting, including but not limited to bushing style slip fittings, as well as threaded, slip ring, and powered rotary fittings. In an example, the rotary fitting has no stops, and is capable of freely rotating an arbitrary number of times in either a clockwise or counter-clockwise direction, although other types of rotary fittings may be employed that exhibit a limited range of motion such as clockwise or counterclockwise rotation through a range of, for example, 30 degrees, 45 degrees, 90 degrees, 180 degrees, or any other value as necessitated by the implementation.

Figure 5:
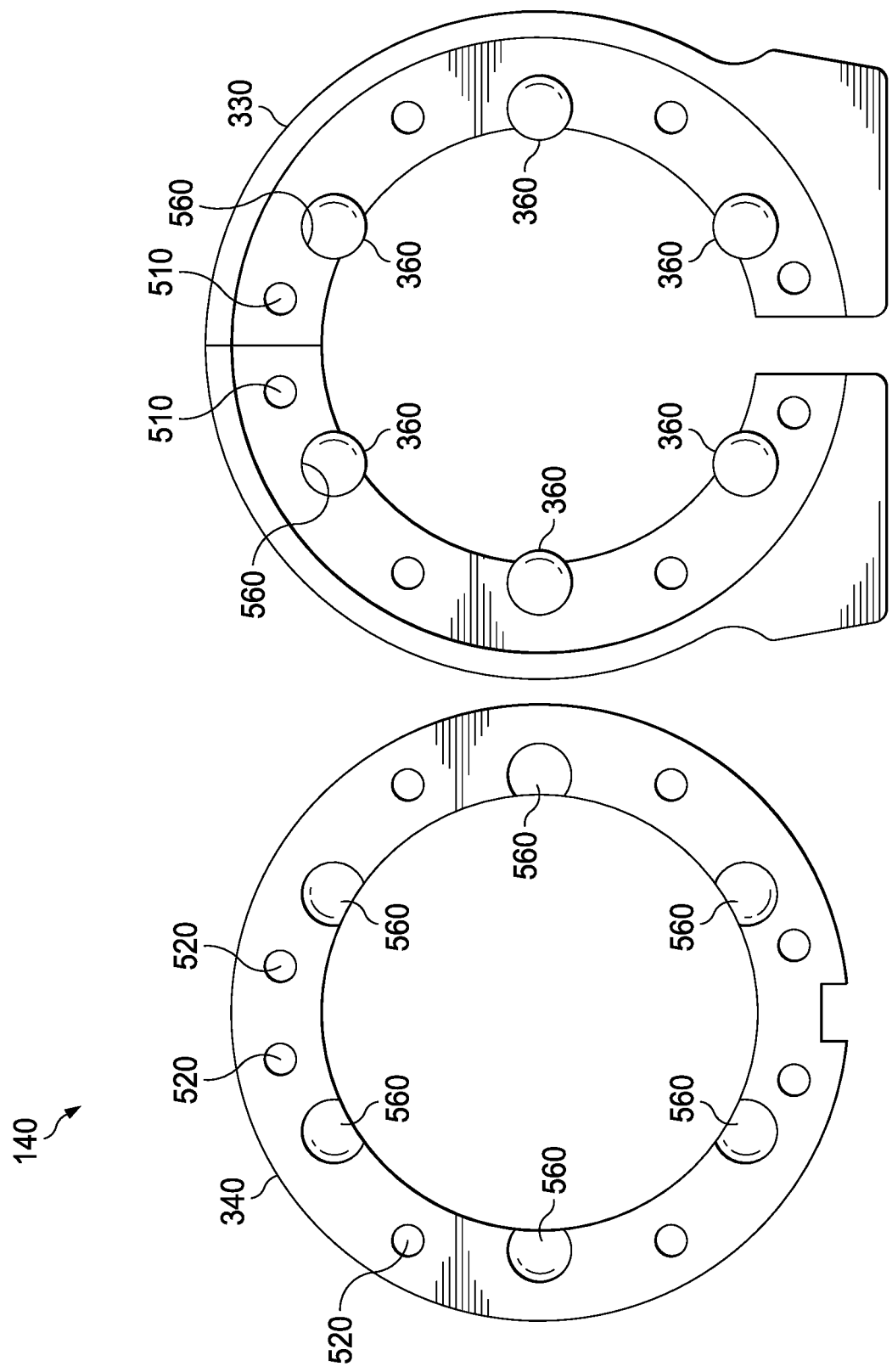
FIG. 5 is a top view of a partially assembled example soft touch bearing.

FIG. 5 is a top view of a partially assembled example soft touch bearing 140. Visible are an upper slip retainer 330 and lower slip retainer 340, each of which, in the embodiment shown in the figure, includes a plurality of ball bearing recesses 560 into which ball bearings 360 can fit. In an example, the lower slip retainer includes a plurality of threaded bolt holes 520, and the upper slip retainer includes a plurality of matching through holes 510, such that the upper slip retainer 330 and lower slip retainer 340 can be bolted together, thus captively retaining the ball bearings 360 in the ball bearing recesses 560.

Figure 6:
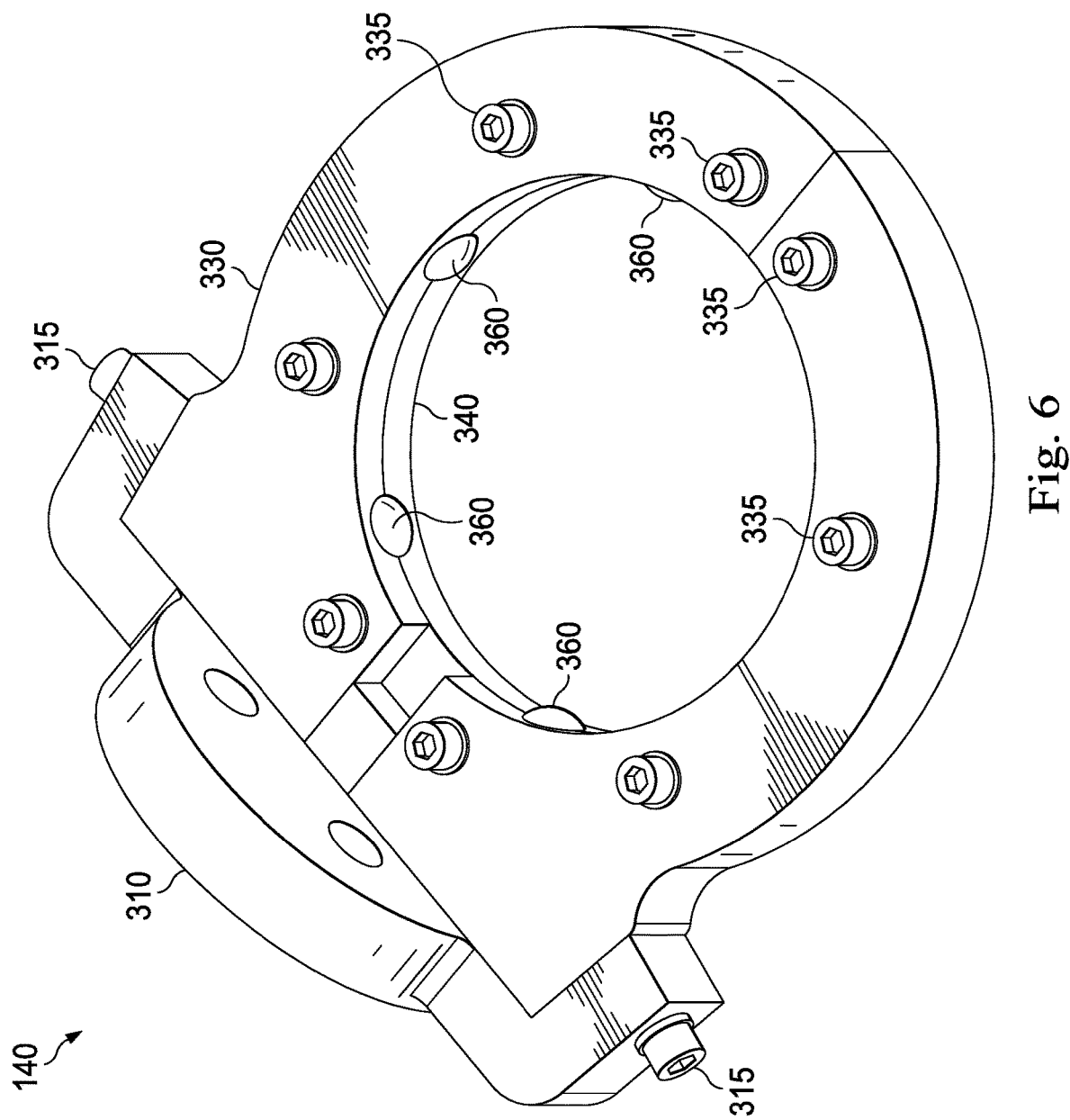
FIG. 6 is a perspective view of a partially assembled example soft touch bearing.

FIG. 6 is a perspective view of a partially assembled example soft touch bearing 140, wherein the upper slip retainer 330 has been fastened to the lower slip retainer 340 with a plurality of fasteners 335, such that a plurality of ball bearings 360 are held captive, forming a rotary bearing into which a tool sleeve can be fitted. Also visible is the cobot coupling 310, held in place with a pair of quick-release bolts 315.

Figure 7:
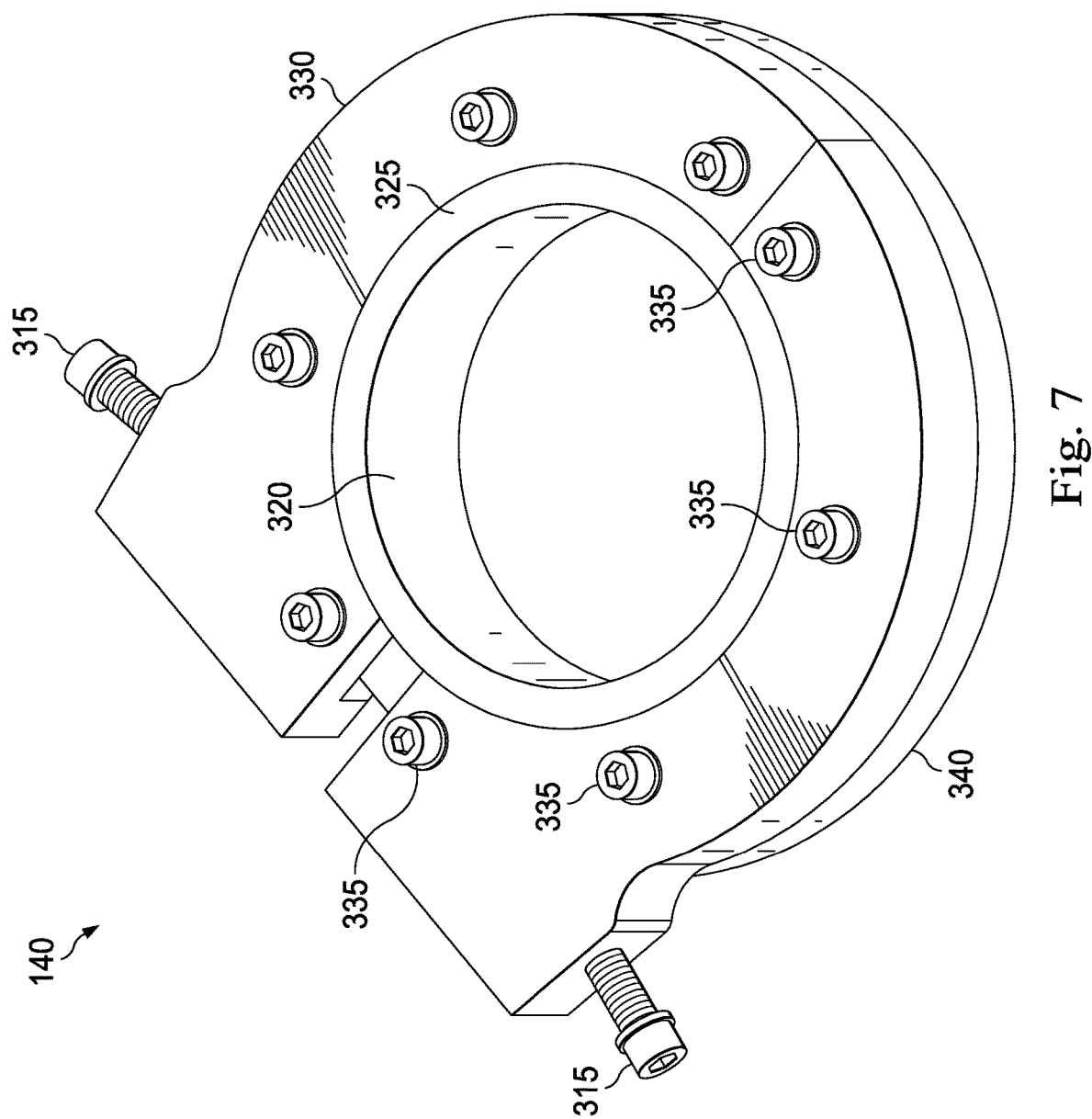
FIG. 7 is a perspective view of a partially assembled example soft touch bearing.

FIG. 7 is a perspective view of a partially assembled example soft touch bearing 140, wherein the upper slip retainer 330 has been fastened to the lower slip retainer 340 with a plurality of fasteners 335, holding captive ball bearings (not pictured) and thus forming a soft touch rotary bearing 140, such that a tool sleeve 320, supported by a tool sleeve ring 325, can freely rotate within the soft touch bearing 140. The tool sleeve can be configured such that a tool is retained within it, or may be configured such that it attaches to a tool holder of an ergonomic arm or zero-balance arm.

Accordingly, it can be seen that soft touch bearing advantageously adds a rotational degree of freedom to a multi-axis robotic arm such as a collaborative robot, thus permitting the robot to position and operate a tool whose weight is supported by, and which may be rotationally fixed to, an ergonomic arm or zero-balance arm. Because the soft-touch bearing spins freely with low resistance, it also limits the transfer of torque from the torque tool into the robotic arm that might otherwise exceed fault limits and cause the robot to fault, lock up, apply brakes, shut down, or suffer damage. Applications of the soft touch bearing include, but are not limited to, high-torque tightening of nuts and bolts on automotive assembly lines. The ability to combine a collaborative robot with an ergo or torque arm means it becomes possible to tighten very high torque joints while utilizing low force robots. A key feature for the assembly shop is using a lightweight, low force robot that can, for example, be attached to a sync cart and utilized on moving lines, unlike an industrial robot.

A number of variations are possible on the examples and embodiments described above. For example, the tool sleeve may include upper and lower tool sleeve rings such that when the soft touch bearing is assembled, the tool sleeve is held captive within the soft touch bearing. The soft touch bearing may be of different dimensions than shown herein, and may be made of a wide variety of different materials, including metals, ceramics, polymers, and composites such as carbon fiber or fiberglass. The tool sleeve of the soft touch bearing may hold other types of tools than torque tools, including but not limited to welding, soldering, painting, coating, and inspection tools. The technology described herein may be applied to manufacturing lines in a variety of different industries, and may also be used in non-manufacturing applications including but not limited to inspection, testing, or research. Accordingly, the logical operations making up the embodiments of the technology described herein are referred to variously as operations, steps, objects, elements, components, or modules. Furthermore, it should be understood that these may occur or be performed in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the soft touch bearing. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the soft touch bearing as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. An apparatus for coupling a robot arm to a tool, comprising:
   a tool sleeve configured to accept the tool, wherein the tool is suspended by an ergonomic arm capable of supporting 3D motion of the tool within a working volume;
   a rotary fitting coupled to the tool sleeve, the rotary fitting freely rotating around a rotational axis; and
   a coupling that couples a distal end of the robot arm to the rotary fitting,
      wherein when the tool is inserted into the tool sleeve, the tool is free to rotate around the rotational axis with respect to the robot arm, such that a motion of the distal end of the robot arm does not impose a torque between the robot arm and the tool around the rotational axis, and such that the motion of the distal end of the robot arm repositions or reorients the tool within at least a portion of the working volume.

2. The apparatus of claim 1, wherein the repositioning includes translating the tool in a horizontal or vertical direction, and wherein the reorienting includes rotating the tool around a desired axis that is different from the rotational axis of the rotary fitting.

3. The apparatus of claim 1, wherein the rotary fitting is at least one of a ball bearing slip fitting or a roller follower fitting.

4. The apparatus of claim 1, wherein the tool is rotationally fixed to the ergonomic arm.

5. The apparatus of claim 1, wherein the ergonomic arm is an unpowered zero-balance arm configured to support a weight of the tool both at rest and during 3D motion of the tool within at least a portion of the working volume.

6. The apparatus of claim 1, wherein the tool is a torque tool, and wherein the rotary fitting reduces torque transfer between the torque tool and the robot arm during operation of the torque tool.

7. The apparatus of claim 1, wherein the coupling is a quick-release coupling.

8. The apparatus of claim 1, wherein the robot arm is associated with a collaborative robot.

9. The apparatus of claim 8, wherein the tool and ergonomic arm are configured such that the tool can be operated by either or both of the collaborative robot and a human worker.

10. The apparatus of claim 9, further comprising the tool.

11. The apparatus of claim 10, further comprising the robot arm.

12. The apparatus of claim 11, further comprising the ergonomic arm.

13. A method for coupling a robot arm to a tool, comprising:
   providing a tool sleeve configured to accept an inserted tool, wherein the tool is suspended by an ergonomic arm capable of supporting 3D motion of the tool within a working volume;
   coupling to the tool sleeve a rotary fitting that freely rotates around a rotational axis; and
   coupling a distal end of the robot arm to the rotary fitting,
   such that when the tool is inserted into the tool sleeve, the tool is free to rotate around the rotational axis with respect to the robot arm,
   such that motions of the distal end of the robot arm do not impose a torque between the robot arm and the tool around the rotational axis, and
   such that the motions of the distal end of the robot arm will reposition or reorient the tool within at least a portion of the working volume.

14. The method of claim 13, wherein the repositioning includes translating the tool in a horizontal or vertical direction, and wherein the reorienting includes rotating the tool around a desired axis that is different from the rotational axis of the rotary fitting.

15. The method of claim 13, wherein the rotary fitting is at least one of a ball bearing slip fitting or a roller follower fitting.

16. The method of claim 13, wherein the tool is rotationally fixed to the ergonomic arm.

17. The method of claim 13, wherein the ergonomic arm is an unpowered zero-balance arm configured to support a weight of the tool both at rest and during 3D motion of the tool within at least a portion of the working volume, and the robot arm is associated with a collaborative robot.

18. The method of claim 13, wherein the tool is a torque tool, and wherein the rotary fitting reduces torque transfer between the torque tool and the robot arm during operation of the torque tool.

19. The method of claim 13, wherein the distal end of the robot arm is coupled to the freely rotating fitting via a quick-release coupling.

20. A system for automating a manufacturing operation, comprising:
   a tool;
   an unpowered zero-balance ergonomic arm supporting the tool and capable of 3D motion of the tool within a working volume;
   a collaborative robot comprising a robot arm;
   a tool sleeve configured to receive the tool;
   a rotary fitting that freely rotates around a rotational axis and is coupled to the tool sleeve; and
   a quick-release coupling that couples a distal end of the robot arm to the rotary fitting,
   such that when the tool is inserted into the tool sleeve, the tool is free to rotate around the rotational axis with respect to the robot arm,
   such that motions of the distal end of the robot arm do not impose a torque between the robot arm and the tool around the rotational axis, and
   such that the motions of the distal end of the robot arm will reposition or reorient the tool within at least a portion of the working volume.

* * * * *